United States Patent

Benea et al.

[11] Patent Number: 5,928,533
[45] Date of Patent: Jul. 27, 1999

[54] METHOD AND APPARATUS FOR CLEANING VULCANIZATION MOLDS FOR ELASTOMER MATERIAL ARTICLES

[75] Inventors: Paolo Benea; Federico Mancosu, both of Milan, Italy

[73] Assignee: Pirelli Coordinamento Pneumatici S.P.A., Milan, Italy

[21] Appl. No.: 08/810,936

[22] Filed: Feb. 27, 1997

[30] Foreign Application Priority Data

Mar. 1, 1996 [IT] Italy .................................. MI96A0396

[51] Int. Cl.⁶ .................................................. B23K 26/00
[52] U.S. Cl. .......................................... 219/121.68; 134/1
[58] Field of Search .......................... 134/1; 219/121.85, 219/121.68, 121.69, 121.78, 121.79, 121.84, 121.77

[56] References Cited

U.S. PATENT DOCUMENTS

| 3,905,155 | 9/1975 | Smith et al. | 451/38 |
| 4,088,865 | 5/1978 | Peters et al. | 219/121.77 |
| 4,728,773 | 3/1988 | Roberts et al. | 219/121.77 |
| 5,373,140 | 12/1994 | Nagy et al. | 219/121.68 |
| 5,643,367 | 7/1997 | Viel | 134/1 |

FOREIGN PATENT DOCUMENTS

| 742089 | 11/1996 | European Pat. Off. . |
| 2641718 | 7/1990 | France . |
| 4413218 | 10/1995 | Germany . |
| 55-100112 | 7/1980 | Japan . |
| 55-100113 | 7/1980 | Japan . |
| 269721 | 4/1926 | United Kingdom . |
| 2169496 | 7/1986 | United Kingdom . |
| 9421418 | 9/1994 | WIPO . |
| 9511764 | 5/1995 | WIPO . |

*Primary Examiner*—Geoffrey S. Evans
*Attorney, Agent, or Firm*—Stevens, Davis, Miller & Mosher, L.L.P.

[57] ABSTRACT

In a vulcanization mold (2) for vehicle tires the rubber blend deposits are cleaned off by the action of one or more laser beams (9) supplied in the form of short-duration and high-energy pulses, which beams cause separation of the rubber blend by effect of the shock wave generated by them and hitting the operating surfaces of the mold (2). Each laser beam (9) is guided by a scanning unit (21a, 21b) mounted on a rotating column (16) for distributing the beam action over the whole circumferential extension of the mold.

15 Claims, 1 Drawing Sheet

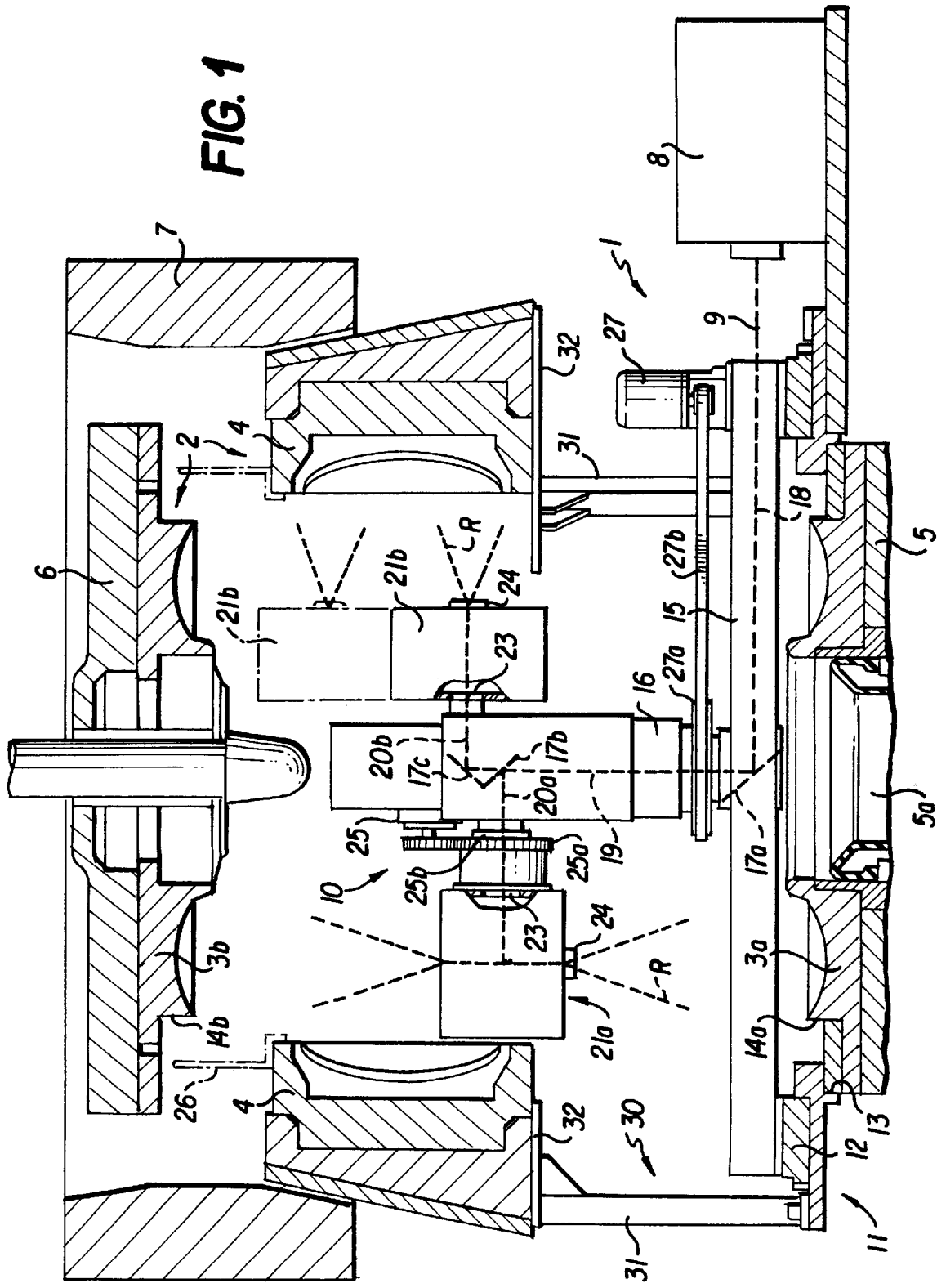

METHOD AND APPARATUS FOR CLEANING VULCANIZATION MOLDS FOR ELASTOMER MATERIAL ARTICLES

FIELD OF THE INVENTION

The present invention relates to a method and apparatus for cleaning vulcanization molds for elastomer material articles. More particularly, the method and apparatus in reference especially aim at carrying out a periodical cleaning of the molds employed in the vulcanization of vehicle wheel tires.

BACKGROUND DISCUSSION

It is known that during the tire production cycle, and more generally when many articles of elastomer material are to be manufactured, a molding and vulcanization step is provided in which the article of manufacture initially in a raw state, is closed into a mold and submitted to a combined pressure and temperature action by effect of which the article of manufacture is shaped according to the desired geometrical configuration and definitively consolidated into this geometrical configuration and also into its physico-molecular structure, as a result of a molecular cross-linking in the elastomer material caused by high temperature.

However, during each vulcanization cycle the tire deposits a very thin rubber layer over the mold surfaces with which it comes into contact. The thickness of this layer becomes increasingly greater as the vulcanization cycles are repeated. Therefore, in the long run, it can reach such values that the aesthetical features of the finished tire are impaired to an unacceptable level and the air vents necessarily provided in the mold walls for ensuring evacuation of the air entrapped between the surface of the article of manufacture to be vulcanized and that of the mold are partly or completely obstructed. Submitting the mold to a careful cleaning action after a certain number of vulcanization cycles becomes therefore necessary.

These cleaning operations presently provide that the mold should be removed from the vulcanization press to be submitted to sandblasting and/or washing operations by means of particular chemical agents within appropriate machines.

When dismantling of the mold occurs, the press shall remain inactive over a certain period of time which may have a duration of eight hours, that is a whole work shift, in that a lapse of time is first required for enabling cooling of the mold, followed by another period of time needed by manpower for dismantling of the mold itself, in turn followed by a further period of time for mounting of another mold and pre-heating of the same until the operating temperature is achieved.

These periods can be reduced, even to a great extent, if automatic systems for quick mold release and devices for mold pre-heating are utilized, but in any case dismantling of the mold from the press is required. This does not represent a drawback when the mold needs to be disassembled in any case to be replaced with another mold of different size and/or tread pattern. However, it is a very onerous operation when the vulcanization cycle must go on with the same tire pattern. In this case the expensive "machine stoppage" to which the press is submitted can be avoided only when another identical mold is available for being mounted in place of the one sent to cleaning. To have such an identical mold available requires a mold pool (inventory) having excess pieces with respect to the real production necessities (keeping such excess pieces in stock is an expensive solution to the problem).

SUMMARY OF THE INVENTION

The present invention relates to carrying out cleaning of the mold using methods and means adapted to preserve the integrity over time of the work surfaces of the mold, without considering actions of the mechanical (abrasion) or chemical (acids and/or solvents) type. In addition, the possibility of carrying out the mold cleaning without dismantling the mold from the vulcanization press has also been considered, with the goal of eliminating all drawbacks resulting from dismantling. Finally it has been determined that both goals could be achieved if cleaning of the mold was carried out by adopting means capable of submitting the surfaces to be cleaned to a shock wave adapted to cause detachment of the rubber deposits from the metallic surfaces of the mold. Within this scope, the use of a laser beam was determined to be particularly appropriate.

In one aspect, the invention relates to a method of cleaning vulcanization molds for elastomer material articles, each mold exhibiting operating surfaces covered with rubber blend deposits to be removed, by causing removal of said deposits by laser light radiation directed at least to the operating surfaces of the mold.

More particularly, the laser light radiation is transmitted to the mold in the form of electromagnetic energy pulses each localized at a delimited surface area of the mold, to cause separation of the blend adhering to the surface areas by effect of a shock wave generated by each electromagnetic energy pulse.

The rubber material removed from said operating surfaces is taken away from the mold by an air stream produced by suction.

The present invention provides an embodiment particularly appropriate to operate on a vulcanization mold for vehicle wheel tires of the type having two coaxially aligned cheeks and circumferential sectors operatively interposed between said cheeks. In this embodiment, the simultaneous action of at least two radiation beams of laser light directed at right angles to each other and pointing to the mold cheeks and sectors respectively, is provided. The laser light radiation produced externally of the mold is in addition preferably provided to be radially guided to the inside of the mold itself and reflected along the geometrical axis of the mold to be subsequently diverted onto the operating surfaces.

Advantageously, the mold submitted to the laser light radiation does not need to be dismantled from the vulcanization press.

In accordance with a second aspect of the present invention, the method is put into practice by an apparatus for cleaning vulcanization molds for elastomer material articles, each mold exhibiting operating surfaces covered with blend deposits to be removed. The apparatus comprises: at least one laser unit arranged to emit at least one laser beam; guide and movement means operatively connected with the laser unit to selectively direct the laser beam to the different areas of the operating surfaces of the mold; and positioning means to be removably fixed relative to the mold for supporting the guide and movement means according to a pre-established positioning within the mold.

In more detail, preferably said laser unit is of the yttrium aluminum garnet (YAG) type, which is well known in the laser units art, adapted to emit electromagnetic energy in the form of sequential pulses.

In a preferred embodiment, the guide and movement means comprises at least one optical scanning unit having: an inlet port through which the laser beam enters the optical scanning unit; an outlet port through which the laser beam comes out of the optical scanning unit; a diverting assembly operatively interposed between the inlet port and the outlet port and operable upon command of a central electronic unit to direct the laser beam according to an angle varying within a predetermined range with respect to the axis of the outlet port.

Advantageously, the optical scanning unit can be positioned for rotation about the axis of the inlet port to selectively point the outlet port to either one of the cheeks of the vulcanization mold, said outlet port being oriented in a direction substantially perpendicular to the inlet port. An embodiment particularly appropriate to operate on a vulcanization mold for vehicle tires having two coaxial cheeks and circumferential sectors operatively interposed between said cheeks, comprises at least two of the optical scanning units, the outlet ports of which are directed to the mold cheeks and sectors respectively.

Preferably, at least the optical scanning unit having the respective outlet port oriented towards the mold sectors can be slidably positioned parallel to the mold axis. Furthermore, the axis of the outlet port can preferably be angled in a range of at least 8° from the orthogonal position relative to the mold axis. The positioning means may advantageously comprise: a centering ring to be coaxially associated with one cheek of the mold; a bridge element in engagement with the centering ring and extending diametrically to the cheek; a supporting column extending from the bridge element in coaxial relationship with the cheeks. It is also preferably provided that the bridge element be angularly movable about the axis of the supporting column.

Advantageously, the supporting column holds the optical scanning unit rotatably about the supporting column axis, so that the laser beam from the outlet port lends itself to being selectively guided along the whole circumferential extension of the mold.

In accordance with a further feature of the present invention, the guide and movement means for the laser beam define an optical path of travel having a first length extending along the bridge element, a second length extending parallel to the supporting column axis and at least one third length extending away from the supporting column for reaching the optical scanning unit through the inlet port.

The apparatus in reference can further comprise at least one annular reflecting element coaxially circumscribing a respective mold cheek, and at least one abutment member arranged to act on the mold sectors to hold them all at a predetermined distance from the centering ring.

Further features and advantages will become more apparent from the detailed description of a preferred and non-exclusive embodiment of a method of cleaning vulcanization molds for elastomer material articles and an apparatus for putting the method into practice, in accordance with the present invention.

BRIEF DESCRIPTION OF THE DRAWINGS

The sole FIGURE shows a diametrical sectional view of an embodiment of an apparatus of the present invention.

DETAILED DESCRIPTION OF THE PREFERRED EMBODIMENTS

This description will be taken hereinafter with reference to the accompanying drawing, given by way of non-limiting example, in which the only FIGURE shows the apparatus of the invention under operating conditions within a vulcanization mold for motor-vehicle tires, diagrammatically represented in a diametrical sectional view.

In the accompanying FIGURE, an apparatus for cleaning vulcanization molds for elastomer material articles in accordance with the present invention has been generally identified by reference numeral 1.

In the described embodiment, apparatus 1 is arranged to carry out cleaning of a mold 2 used in the vulcanization of motor-vehicle tires. In a manner known per se, this mold 2 has a lower cheek 3a and an upper cheek 3b disposed coaxially and intended for operating on the opposite sidewalls of the tire being worked, and a plurality of circumferential sectors 4 operatively interposed between the cheeks 3a, 3b to define a raised pattern on the tread band of the tire itself. Under operating conditions, the lower cheek 3a is fastened to a bed 5 of a vulcanization press. In the central part of the bed 5 a vulcanization chamber 5a is operatively mounted. This chamber 5a is designed to be inflated with steam under pressure at the inside of the tire so that the tire is pushed against the inner walls of the mold 2, and to carry out the necessary heat supply for the vulcanization operation. The upper cheek 3b is in turn fastened to a movable support 6 to which an annular element 7 is also connected for operatively engaging the sectors 4 and setting them in motion. Thus, they are axially moved close to or away from the mold axis, during a closing and opening step of the mold 2, respectively. The support 6 and annular element 7 are movable relative to the bed 5 and to each other to alternately cause closing of the mold 2 and opening of same to enable the vulcanized tire to be extracted and replaced with a new tire to be vulcanized.

All that being stated, the apparatus 1 essentially comprises at least one laser unit 8 arranged to emit at least one laser beam 9, guide and movement means 10 operatively connected with the laser unit 8 to selectively direct the laser beam 9 to different areas of the operating surfaces of the mold 2, as well as positioning means 11 to be removably fastened to the mold 2 to suitably hold the guide and movement means 10 in a predetermined position within the mold 2 itself.

In a preferred embodiment, the laser unit 8, only diagrammatically shown since it is commonly available on the market, is of the well known yttrium aluminum garnet (YAG) type. It is designed to emit two distinct laser beams parallel to each other (shown in the drawing by line 9 alone), each consisting of a sequence of short-duration and high-energy pulses. More particularly, each laser beam preferably has a diameter included between 6 and 12 mm, and is emitted in the form of pulses each having a duration included between 3 and 8 nanoseconds (ns) and an energy included between 300 and 500 microjoules ($\mu$J).

The laser beams, initially lying in distinct planes disposed in side by side relation, are intended for following distinct optical paths of travel within the guide and movement means 10 to be directed against the cheeks 3a, 3b and sectors 4 respectively, as better clarified in the following description.

The positioning means 11 preferably is comprised of a centering ring 12 to be coaxially associated with one of the mold cheeks, preferably the lower one 3a. Preferably, engagement between the centering ring 12 and cheek 3a takes place at an outer perimetric rim 13 of the cheek 3a itself, spaced apart from a perimetric junction wall 14a where junction between said cheek 3a and sectors 4 occurs for confining the inner mold cavity 2 when the mold is in a closed condition.

Operatively connected to the centering ring 12 is a bridge element 15 preferably of a tubular structure and extending diametrically above the lower cheek 3a. Standing from the bridge element 15 is an internally-hollow supporting column 16 in coaxial relationship with the cheeks 3a, 3b.

In a preferred embodiment, the positioning means 11 further comprises at least one abutment member 30 fastened to the centering ring 12 and arranged to interfere with the lower ends of sectors 4 so as to hold them at a given distance from the ring 12 itself. This abutment member 30 can be formed of three or more supporting elements 31 carrying an annular rest element 32 adapted to act against the sectors 4.

The guide and movement means 10, comprising a first, a second and a third reflecting elements 17a, 17b, 17c for example, guide a corresponding one of the beams 9 emitted from the laser unit 8 in an optical path of travel having a first length 18 extending longitudinally in the bridge element 15, a second length 19 extending within the column 16 parallel to the axis of the latter, and a third length 20a, 20b extending in a perpendicular direction away from the supporting column itself. In the embodiment shown, the two beams 9 admitted to the first length 18 directly from unit 8, are both deviated on the second length 19 by the first reflecting element 17a. Along the second length 19 the mutually separated beams reflect off the second and third reflecting elements 17b, 17c respectively, that divert them along the respective third lengths 20a, 20b extending radially of the column 16 axis in respectively opposite directions.

The third lengths 20a, 20b terminate at a respective first and second optical scanning unit 21a, 21b upon the action of which the laser beams are selectively oriented towards different areas of the operating mold surfaces. Each optical scanning unit 21a, 21b is only briefly described in that it is similar to, or can be easily deduced from operatively similar units commonly available on the market (the galvanometric XY Modules from SCANLAB of München, Germany, for example). To achieve this selective orientation, each of the optical scanning units 21a, 21b, essentially has a diverting assembly housed within a box-shaped structure 22. Structure 22 has an inlet port 23 is formed which is in alignment with the third length 20a, 20b to enable the laser beam to enter the scanning unit 21a, 21b, as well as an outlet port 24 through which the laser beam comes out of said scanning unit. In a manner known per se each diverting assembly not shown in the FIGURE, essentially consists of an assembly of mirrors and/or prisms movable upon command of respective galvanometric motors managed by a central electronic unit so as to direct the respective laser beam according to an angle included within a predetermined range about the axis of the outlet port 24.

The deviation angle of the laser beam can take any value within a given range (a cone of an amplitude at least equal to 25°) fixed by the optical and mechanical features of the components of the optical diverting assembly 21a, 21b and/or in connection with specific requirements. In conclusion, the maximum deviation angle of the laser beam coming out of the optical diverting assembly 21a, 21b defines a reach identified by R having said cone or conoid configuration for example, delimiting a circular or ellipsoidal reach on the operating mold 2 surfaces. Within this reach R the beam can be directed to any area of an amplitude corresponding to the diametric size of the beam itself, while taking care to keep the beam always focused to maximize the instantaneous power transmitted to the area.

As clearly shown in the accompanying FIGURE, the first and second optical scanning units 21a, 21b are oriented in a manner enabling each of them to direct its own laser beam to the cheeks 3a, 3b and the sectors 4 of the mold 2, respectively. The first optical scanning unit 21a can be rotatably positioned about the axis of its inlet port 23 so as to carry out an angular rotation in the range of 180°, to selectively orient the outlet port 24, and consequently the laser beam, towards either one of the cheeks 3a, 3b. Rotation of the first optical scanning unit 21 about the axis of the inlet port 23 can be achieved by a stepping motor 25 for example, or another type of motor operating on a ring gear 25a integral with the scanning unit itself, said ring gear being rotatably in engagement with a sleeve 25b radially projecting from column 16.

Usually, the size and geometrical conformation of the cheeks 3a, 3b are of such a nature that the radial extension of each of them is completely contained within the reach R of the first scanning unit 21a. In the case of cheeks radially extended more than the maximum diameter of said reach R the possibility of moving the scanning unit 21a in a direction orthogonal to the supporting column 16 axis can be advantageously provided. In order to ensure the laser beam action also over areas of the cheeks 3a, 3b that do not directly face the scanning unit 21a, the presence of at least one annular reflecting element 26 coaxially circumscribing the cheek itself may be further provided. In the embodiment shown, such a reflecting element 26, shown in chain line in the drawing, is linked to the upper part of sectors 4 to suitably reflect the laser beam on a junction surface 14b perimetrically exhibited by the upper cheek 3b. This junction surface 14b, oriented parallel to the geometrical axis of the mold 2, is subject to become dirty due to the rubber material penetrating between the sectors 4 and the cheek 3b itself during the molding step of the tire, and therefore must also be periodically cleaned. A similar annular reflecting element (not shown) may be also coaxially associated with the lower cheek 3a to facilitate cleaning of the junction surface 14a thereof.

The second optical scanning unit 21b intended for cleaning sectors 4 is preferably associated with column 16 in such a manner that it can slide along the same to be positioned parallel to the geometrical axis of the mold. In more detail, the second scanning unit 21b can be selectively positioned, upon command of one or more actuators not shown, as feasible in a manner known per se, between a first operating position in which it is disposed relatively close to the bed 5 and a second operating position in which it is spaced apart from the bed itself, as shown in phantom lines.

Still more preferably, the second optical scanning unit 21b is also advantageously mounted on column 16 in a manner enabling the orientation at least of the outlet port 24 axis to be varied with respect to the plane containing the column axis. The orientation may be varied within a circular range of an amplitude equal to at least 8° relative to the direction perpendicular to the plane, so that the axis of the laser beam reach can be inclined with respect to the geometrical axis of the mold within the values.

Clearly, the possibility of varying the inclination of the axis of the laser beam outlet port can be also applied to the first optical scanning unit 21a, in combination with or alternatively to the possibility of making the unit carry out a radial translation relative to the axis of the supporting column 16.

The selective positioning of the second scanning unit 21b in the first and second operating positions and according to different inclinations enables the laser beam coming out of same to reach the operating surfaces of the sectors according to different angles. This eliminates the risk that some areas may not be conveniently reached by the laser beam by effect of the shadow created by the presence of the number of fins and/or ribs usually arranged on the sectors 4 in order to form the raised thread pattern of the tire tread band.

In order to enable the laser beam to act over the whole circumferential extension of the cheeks 3a, 3b and sectors 4, the optical scanning units 21a, 21b are also provided to be positioned for rotating about the geometrical axis of the mold. Thus, the laser beams coming out of the respective outlet ports 24 lend themselves to being selectively positioned along the whole circumferential extension of the mold itself.

More particularly, the supporting column 16 is provided to be rotatably in engagement with the bridge element 15 and operable in rotation, e.g. upon command of a stepping motor 27 acting on a toothed pulley through a driving belt 27b. Preferably, rotation of the supporting column 16 takes place through angles of 180° in opposite directions relative to an intermediate reference position, in order to avoid the difficulties that a continuous rotation greater than 180° could involve with reference to the electrical connections necessarily arranged for operation and movement of the scanning units 21a, 21b.

For the purpose of avoiding that the inevitably produced shadow of the bridge element 15 may inhibit an efficient cleaning of some areas in the lower cheek 3a, the bridge element is advantageously provided to be angularly movable about the axis of the supporting column 16. The angular rotation of the bridge element 15 preferably included within 5° and 15° can be obtained for example by a motor, not shown, acting on a toothing 28 peripherally carried by the bridge element 15 itself.

Operation of the apparatus, described above mainly as regards to structure, is as follows.

When the mold is in its completely open condition, the apparatus 1 is mounted on the vulcanization press and engagement between the centering ring 12 and the press bed 5 occurs coaxially with the lower cheek 3a. When mounting has been completed, the annular element 7 carrying sectors 4 is lowered towards the bed 5 until the sectors come to rest on the annular element 32 of the abutment member 30.

At this point the laser unit 8 and optical scanning units 21a and 21b are activated, so that the laser beams are suitably conducted onto the operating surfaces of one of the cheeks 3a, 3b, the upper cheek 3b for example, and onto sectors 4.

At the points where the operating surfaces of the mold 2 are hit by the laser beam, each energy pulse carried by the beam causes a shock wave which causes detachment of the encrusting thin layer of vulcanized rubber deposited on the mold metal surfaces. This detachment is likely to be due to the fact that, since metal and rubber have different physical features and, in particular, different moduli of elasticity, they react to the shock wave with different resonances that precisely cause separation of the rubber material from the metal surface.

Movement of the laser beam by the corresponding scanning unit 21a, 21b enables the action of the beam itself to be homogeneously distributed over the whole extension of the operating mold surfaces, within the reach R of the unit itself.

Upon the action of the rotation motor 27 acting on the supporting column 16, the scanning units 21a, 21b are by turns rotated about the geometrical axis of the mold 2. The rotation occurs in a stepping or substantially continuous movement, depending on requirements, until the action of the laser beams has been distributed over the whole circumferential extension of the cheek 3b and sectors 4.

At this point the first optical scanning unit 21a is rotated through 180° about the axis of its own inlet port 23 to direct the laser beam towards the lower cheek 3a, or vice versa. The second scanning unit 21b in turn is shifted from the first to the second operating position, or vice versa, so that it is ready to operate on sectors 4 according to an axial positioning different from the preceding one. In each operating position, the reach R axis of the laser beam will be caused to vary depending on specific requirements so that each point of the sector surface can be surely reached by the laser beam with the expected inclination and intensity. Therefore the action of the laser beam is distributed over the whole circumferential extension of the lower cheek 3a and sectors 4, in the same manner as previously described.

At the end of cleaning or during the cleaning step, the vulcanized rubber fragments coming off the mold 2 can be easily removed by an air stream produced by a suction device for example, that can equally be either of the portable manual type or the automatic type, directly installed on the vulcanization press or the cleaning apparatus 1.

The present invention achieves important advantages.

It is pointed out that the method and apparatus of the invention enable a perfect cleaning of the vulcanization mold to be carried out in a maximum period of time of approximately 2 to 3 hours. This cleaning time can be further reduced by arranging more than two scanning units simultaneously operating on the mold sectors and cheeks.

In this connection it is noted that the method and apparatus of the invention also enable the simultaneous cleaning of several molds, e.g. cleaning of one pair of molds mounted on presses provided with two mold seatings operable in parallel. In this case each mold only needs to be provided with its own positioning device, as all the positioning devices can be supplied from a single laser unit 8 emitting the necessary number of laser beams subsequently conducted to the different positioning devices by appropriate reflecting and guide means.

In addition, the invention enables the mold cleaning process to be carried out while keeping the mold directly mounted on the press, without waiting for cooling of same, the mold being immediately available for a new operating cycle as soon as the cleaning operation is over.

It should be also noted that the laser beam enables a perfect cleaning of the molds to be carried out without altering the metal surface of same, which on the contrary happens with conventional cleaning processes by sandblasting that inevitably bring about a certain wear in the molds.

With reference to the use of solvents or other washing chemicals according to the known art, the invention also eliminates all toxicity and pollution problems connected with the use and disposal of chemical substances after use.

Another advantage of the invention is that the same apparatus can be employed for equally effective cleaning of molds of cast iron, aluminium or other materials. This eliminates the necessary provision of different washing and/or sandblasting agents specifically required in the known art for carrying out cleaning of each specific mold type. The method of the invention also enables cleaning of the mold to be enhanced as even the innermost areas of the vent ducts can be reached. This was practically impossible with the traditional cleaning methods of washing and/or sandblasting.

In the light of the advantages achieved by the present invention, a more frequent cleaning of the molds than in the known art becomes convenient. This will bring about an improvement in the consistency of the finished product quality and a reduction in machine shop rejections.

What is claimed is:

1. An apparatus for cleaning a vulcanization mold, for vehicle tires, said mold comprising two coaxial cheeks (3a, 3b) and circumferential sectors (4) operatively interposed between said cheeks (3a, 3b), said mold (2) exhibiting operating surfaces covered with vulcanized rubber deposits to be removed, comprising:

at least one laser unit (8) arranged to emit at least one laser beam (9);

guide and movement means (10) operatively connected with the laser unit (8) to selectively direct the laser beam (9) to different areas of the operating surfaces of the mold (2) and comprising rotatable means to selectively orient the laser beam towards either one of said cheeks; and positioning means (11) to be removably fixed to the mold (2) for supporting the guide and movement means (10) according to a pre-established positioning within the mold (2).

2. An apparatus according to claim 1, wherein said laser unit (8) is adapted to emit electromagnetic energy in the form of sequential pulses.

3. An apparatus according to claim 1, wherein said guide and movement means (10) comprises at least one optical scanning unit (21a, 21b) having:

one inlet port, (23) through which the laser beam (9) enters the optical scanning unit (21a, 21b);

an outlet port (24) through which the laser beam (9) comes out of the optical scanning unit (21a, 21b); and a diverting assembly operatively interposed between said inlet port (23) and said outlet port (24) and operable upon command of a central electronic unit to direct said laser beam (9) according to a predetermined angle with respect to an axis of the outlet port (24).

4. An apparatus according to claim 3, further comprising at least one annular reflecting element (26) coaxially circumscribing one of said cheeks (3b) of the mold (2).

5. An apparatus according to claim 1, wherein the laser unit and a reflecting element are aligned to direct the laser beam to have an optical path having a first section of path (18) radial with respect to the mold.

6. An apparatus according to claim 1, wherein the guide and movement means directs the laser beam at any desired direction within a cone of a given angle.

7. An apparatus for cleaning a vulcanization mold (2), comprising:

said vulcanization mold, wherein said mold (2) exhibits operating surfaces covered with vulcanized rubber deposits to be removed;

at least one laser unit (8) arranged to emit at least one laser beam (9);

guide and movement means (10) operatively connected with the laser unit (8) to selectively direct the laser beam (9) to different areas of the operating surfaces of the mold (2); and positioning means (11) to be removably fixed to the mold (2) for supporting this guide and movement means (10) according to a pre-established positioning within the mold (2), wherein said guide and movement means (10) comprises at least one optical scanning unit (21a, 21b) having:

one inlet port (23) through which the laser beam (9) enters the optical scanning unit (21a, 21b);

an outlet port (24) through which the laser beam (9) comes out of the optical scanning unit (21a, 21b), and a diverting assembly operatively interposed between said inlet port (23) and said outlet port (24) and operable upon command of a central electronic unit to direct said laser beam (9) according to a predetermined angle with respect to an axis of the outlet port (24);

wherein said vulcanization mold is a vulcanization mold for vehicle tires (2) provided with two coaxial cheeks (3a, 3b) and circumferential sectors (4) operatively interposed between said cheeks (3a, 3b), wherein one of said at least one optical scanning unit (21a) is positionable for rotation about an axis of said inlet port (23) to selectively point the outlet port (24) to either one of said cheeks (3a, 3b) of the vulcanization mold (2).

8. An apparatus according to claim 7, wherein said optical scanning unit (21b) has the respective outlet port (24) oriented towards the mold sectors (4).

9. An apparatus according to claim 8, wherein said optical scanning unit (21b) is slidably positioned parallel to the geometrical axis of the mold (2).

10. An apparatus according to claim 7, comprising at least two of said optical scanning units (21a, 21b) the outlet ports (24) of which are oriented towards the mold cheeks (3a, 3b) and sectors (4), respectively.

11. An apparatus according to claim 7, wherein said positioning means (11) comprises:

a centering ring (12) to be coaxially associated with one cheek (3a) of the mold (2);

a bridge element (15) in engagement with said centering ring (12) and extending diametrically to said cheek (3a); and a supporting column (16) extending from said bridge element (15) in coaxial relationship with said cheeks (3a, 3b).

12. An apparatus according to claim 11 wherein said supporting column (16) holds the optical scanning unit (21a, 21b) rotatably about the supporting column axis, so that the laser beam (9) from said outlet port (24) is selectively guidable along a whole circumferential extension of the mold (2).

13. An apparatus according to claim 11 wherein said bridge element (15) is angularly movable about the axis of the supporting column (16).

14. An apparatus according to claim 11, wherein said guide and movement means (10) defines an optical path of travel having a first length (18) extending along said bridge element (15), a second length (19) extending parallel to the supporting column (16) axis and at least one third length (19a, 19b) extending away from the supporting column (16) for reaching the optical scanning unit (21a, 21b) through said inlet port (23).

15. An apparatus according to claim 11, wherein said positioning means (11) comprises at least one abutment member (30) arranged to act on said sectors (4) to sustain them at a predetermined distance from said centering ring (12).

* * * * *